US009499984B2

(12) United States Patent
Manning

(10) Patent No.: US 9,499,984 B2
(45) Date of Patent: Nov. 22, 2016

(54) METHOD FOR FABRICATING SIX-SIDED CONCRETE MODULES

(71) Applicant: Strong Built Structures, Inc., McAlester, OK (US)

(72) Inventor: Jeffery Alan Manning, McAlester, OK (US)

(73) Assignee: Strong Built Structures, Inc., McAlester, OK (US)

( * ) Notice: Subject to any disclaimer, the term of this patent is extended or adjusted under 35 U.S.C. 154(b) by 0 days.

(21) Appl. No.: 14/699,791

(22) Filed: Apr. 29, 2015

(65) Prior Publication Data

US 2015/0322664 A1 Nov. 12, 2015

Related U.S. Application Data

(60) Provisional application No. 61/989,940, filed on May 7, 2014.

(51) Int. Cl.
*E04B 1/00* (2006.01)
*E04C 5/06* (2006.01)
*E04B 1/16* (2006.01)
*E04B 2/84* (2006.01)
*E04B 5/32* (2006.01)
(Continued)

(52) U.S. Cl.
CPC ............ *E04C 5/064* (2013.01); *E04B 1/16* (2013.01); *E04B 1/161* (2013.01); *E04B 2/84* (2013.01); *E04B 5/32* (2013.01); *E04B 9/22* (2013.01); *E04C 5/012* (2013.01); *E04C 5/0631* (2013.01); *E04C 5/073* (2013.01); *E04F 17/08* (2013.01); *E04H 9/14* (2013.01)

(58) Field of Classification Search
CPC .............. E04B 1/16; E04B 1/04; E04B 1/38; E04B 1/48; E04B 1/161; E04B 1/162; E04B 1/348; E04B 5/32; E04B 2/84; E04B 9/227; E04F 17/08; E04C 5/073
USPC ................ 52/742.1, 742.12, 742.13, 742.14, 52/742.15, 79.11, 231, 236.5, 258, 261, 52/274, 293.1, 294, 295; 249/13, 26, 27, 249/24, 83; 264/34
See application file for complete search history.

(56) References Cited

U.S. PATENT DOCUMENTS 4,002,788 A * 1/1977 Lott ...................... B28B 11/042
118/408
4,147,009 A * 4/1979 Watry ...................... E04B 1/06
264/228

(Continued)

OTHER PUBLICATIONS

PCT International Search Report and Written Opinion for PCT/US15/28892, date of mailing Sep. 29, 2015, 13 pages.

(Continued)

*Primary Examiner* — Mark Wendell
(74) *Attorney, Agent, or Firm* — Peter J. Meza; Hogan Lovells US LLP

(57) ABSTRACT

A method to create a precast concrete module includes: pouring the foundation; placing a welded wire mesh reinforced polystyrene panel into a wet mix; allowing the mix to partially set up, and pouring the top of the slab; installing wall and roof panels and mechanically attaching them with welded wire mesh; installing electrical and plumbing prior to placing concrete forms; placing the forms and pouring concrete mix into the forms; and wrecking the forms and finishing out the module.

20 Claims, 11 Drawing Sheets

(51) Int. Cl.
*E04B 9/22* (2006.01)
*E04F 17/08* (2006.01)
*E04C 5/07* (2006.01)
*E04C 5/01* (2006.01)
*E04H 9/14* (2006.01)

(56) References Cited

U.S. PATENT DOCUMENTS

| | | | |
|---|---|---|---|
| 4,185,423 A | | 1/1980 | Gutierrez |
| 4,290,246 A | * | 9/1981 | Hilsey ............... E02D 27/02 52/125.3 |
| 5,033,248 A | * | 7/1991 | Phillips .............. E04B 1/04 52/742.14 |
| 6,324,812 B1 | * | 12/2001 | Drya-Lisiecka ....... E02D 27/02 52/272 |
| 6,503,024 B2 | | 1/2003 | Rupiper |
| 6,530,553 B1 | * | 3/2003 | Diorio ................ E04B 5/38 249/13 |
| 6,976,344 B2 | * | 12/2005 | Sanger ................ E04B 1/04 52/270 |
| 7,673,422 B2 | * | 3/2010 | De La Marche ... E04B 1/34846 52/220.2 |
| 2003/0177737 A1 | * | 9/2003 | Byrd ................. C04B 28/02 52/742.14 |
| 2005/0155297 A1 | | 7/2005 | Aburto Ponce |
| 2006/0016146 A1 | * | 1/2006 | Heath ............... E04C 2/049 52/633 |
| 2007/0283647 A1 | | 12/2007 | Farrell, Jr. |
| 2008/0193712 A1 | * | 8/2008 | Desjardins ........... B32B 13/04 428/119 |
| 2009/0094927 A1 | * | 4/2009 | Farrell, Jr. .......... E04C 2/044 52/583.1 |
| 2010/0132283 A1 | | 6/2010 | Platt et al. |
| 2011/0099927 A1 | * | 5/2011 | Garcia Viar ......... E04B 2/8647 52/220.2 |
| 2011/0214391 A1 | | 9/2011 | Guevara et al. |
| 2014/0137727 A1 | * | 5/2014 | Riley ................ E04C 2/06 89/36.02 |

OTHER PUBLICATIONS

Balogh, Anne, "Not Gone With the Wind", Kit for building an all-concrete safe room offers affordable shelter from storms, Publication #C00B098, Copyright 2000, The Aberdeen Group a division of Hanley-Wood, Inc., 2 pages.

Branz Appraisal No. 750 (2011), EVG 3D Building System, amended Jun. 11, 2015, Technical Assessments of products for building and construction, 7 pages.

* cited by examiner

METHOD FOR FABRICATING SIX-SIDED CONCRETE MODULES

CROSS REFERENCE TO RELATED APPLICATION

The present application is related to and claims priority of U.S. provisional patent application ("Provisional Application"), Ser. No. 61/989,940, entitled "PRECAST CONCRETE MODULE", filed on May 7, 2014. The Provisional Application is hereby incorporated by reference in its entirety.

FIELD OF THE INVENTION

The present invention is related to building methods, and, more particularly, to a method of fabricating a six-sided concrete module, and also to retrofitting existing structures with the six-sided concrete module or modules in order to create a safe room or storm shelter.

BACKGROUND OF THE INVENTION

Six-sided concrete modules are known in the art. However, previous methods included casting panels either horizontally or vertically and then mechanically attaching the panels together at a later time, which resulted in an overall weak structure. What is desired, therefore, is an enhanced fabrication method wherein all of the walls and the ceiling or roof of the structure are cast together in a monolithic pour that better ties the structure together to form a stronger concrete module.

SUMMARY OF THE INVENTION

According to an embodiment of the present invention, a fabrication method for providing a six-sided concrete module includes a structural wire reinforced insulating polystyrene panel that is mechanically attached with welded wire mesh on both primary sides of the panel. The minor sides of the panel are also wrapped with mesh prior to pouring or injecting the concrete mix into the forms or molds. The polystyrene panels range in thickness from 1.5" to 10". The thicker panels have added insulating value, and also strengthen the wall sections as the structural concrete facing is spaced further apart.

The method of the present invention uses high-strength light-weight cellular concrete mixes that range from 4,000 psi to 20,000 psi. Whereas standard concrete weighs approximately 150 lbs per cubic foot, the mix used for the present invention ranges from about 90 lbs to 120 lbs per cubic foot. The concrete is reinforced with high strength helical-shaped metal fibers. The helical fibers used for concrete mixes in the present invention are about 25 mm in length, have a diameter of about 0.50 mm (0.02 in), a weight of about 11,500 fibers per pound, have a tensile strength of about 246.5 ksi minimum, are made of high carbon steel, and are electroplated with zinc. Reinforcement in this fashion allows the fibers to come under tension as soon as the concrete exhibits micro-cracks. This gives the concrete higher ductile strength than conventional rebar or mesh-reinforced concrete. The special helical shaped fibers allow the concrete mix have a 200% increase in ductile strength when measured with respect to conventionally reinforced concrete. The cellular concrete mix is made lighter and stronger by adding a foaming agent to the mix, which creates "thick-skinned" bubbles. The bubbles act as tiny ball bearings, which improve movement and finishing, cracking, pitting, and bleeding. The bubbles also act similarly to a strong honeycomb, as the cement and water form chemical bonds forming cells walls in the matrix structure. As the concrete cures, the water is slowly released from the bubbles into the concrete—a benefit referred to as internal curing. The bubbles also have an effect of creating specific-sized bubbles in the concrete, which gives the concrete insulating properties while also decreasing the weight of the concrete.

The method of the present invention also uses monolithic casting. The method and system of the present invention can be used to cast complete six-sided concrete modules, or retrofitted into existing structures to create a safe room, storm shelter, or other such structures. The safe rooms and shelters can be designed to withstand blast pressure up to 12 psi. This is accomplished by strengthening the concrete mix, widening the concrete cross-section of the system, and/or spacing the structural concrete panels further apart from each other separated by the foam core.

The precast concrete modules created using the system and method of the present invention have many uses. The six-sided modules are fully independent of each other and can therefore be used in a stand-alone application to create a safe room, cabin, guard shack, one room dwelling, or other high-valued asset protective structure. The six-sided modules can be placed together both horizontally and vertically to create single and multi-family housing, hotels, barracks, offices, schools, storages units/facilities, as well as other such structures. The six-sided precast concrete modules according to the present invention are energy efficient, blast resistant, bullet resistant, tornado resistant, fire resistant, and earthquake resistant all due to the specialized way that the concrete is reinforced with both welded wire mesh and helical-shaped metallic reinforcement that is mixed integrally with the high-strength concrete. The concrete modules of the present invention are very strong structurally, but also are light in weight than if they were cast with conventional, non-cellular concrete. The fabricated units have high energy efficient values due to the use of insulating polystyrene panels and the cellular concrete mix.

The manufacturing steps used to create a precast concrete module according to the present invention include: pouring the foundation; placing a welded wire mesh reinforced polystyrene panel into a wet mix, or pouring mix partially up to a structural panel that is placed prior to placing concrete; allowing the mix to partially set up, and pouring the top of the slab either before wall panels are attached to the pre-placed wire mesh, or after; installing wall and roof panels and mechanically attaching them with welded wire mesh; installing any electrical, plumbing, or other design-required provisions prior to placing the concrete forms; placing the forms and pouring or injecting concrete mix into the forms; and wrecking the forms and finishing out the modules.

As described above, the six-sided concrete modules of the present invention can be used to retro-fit an existing structure. The procedures and steps to retro-fit an existing structure to include a strong-built safe room or storm shelter according to the present invention include; designing a safe room to existing room dimensions and design loads; making any provisions to strengthen existing walls to handle the hydrostatic loads of the concrete mix; drilling holes to accept rebar for mechanically attaching walls to an existing concrete foundation; epoxying the rebar in holes using high-strength epoxy per design; placing reinforced polystyrene wall panels and attaching to the rebar placed in the concrete foundation (offset panels from existing interior walls to the required distance are used to allow a designed concrete cross-section to be cast between the panel and the existing wall); attaching reinforced polystyrene roof panels and mechanically fastening panels to each other per design (ensure that the roof panel is properly spaced from the existing ceiling to allow proper concrete thickness between the panel and the existing ceiling per the engineer design); making holes in the polystyrene panels to allow equal flow of the concrete mix on each side of the panels and air to escape as mix is injected into the forms; drilling holes through the existing ceiling to allow air to escape as concrete mix is injected into the forms; forming interior walls and ceiling; injecting high strength helical fiber mix into the forms until the mix fills drilled holes in existing ceiling/floor above the new safe room or storm shelter; and stripping and wrecking the concrete forms after the mix has properly cured.

The foregoing and other features, utilities and advantages of the invention will be apparent from the following more particular description of an embodiment of the invention as illustrated in the accompanying drawings.

DETAILED DESCRIPTION

Figure 1A:
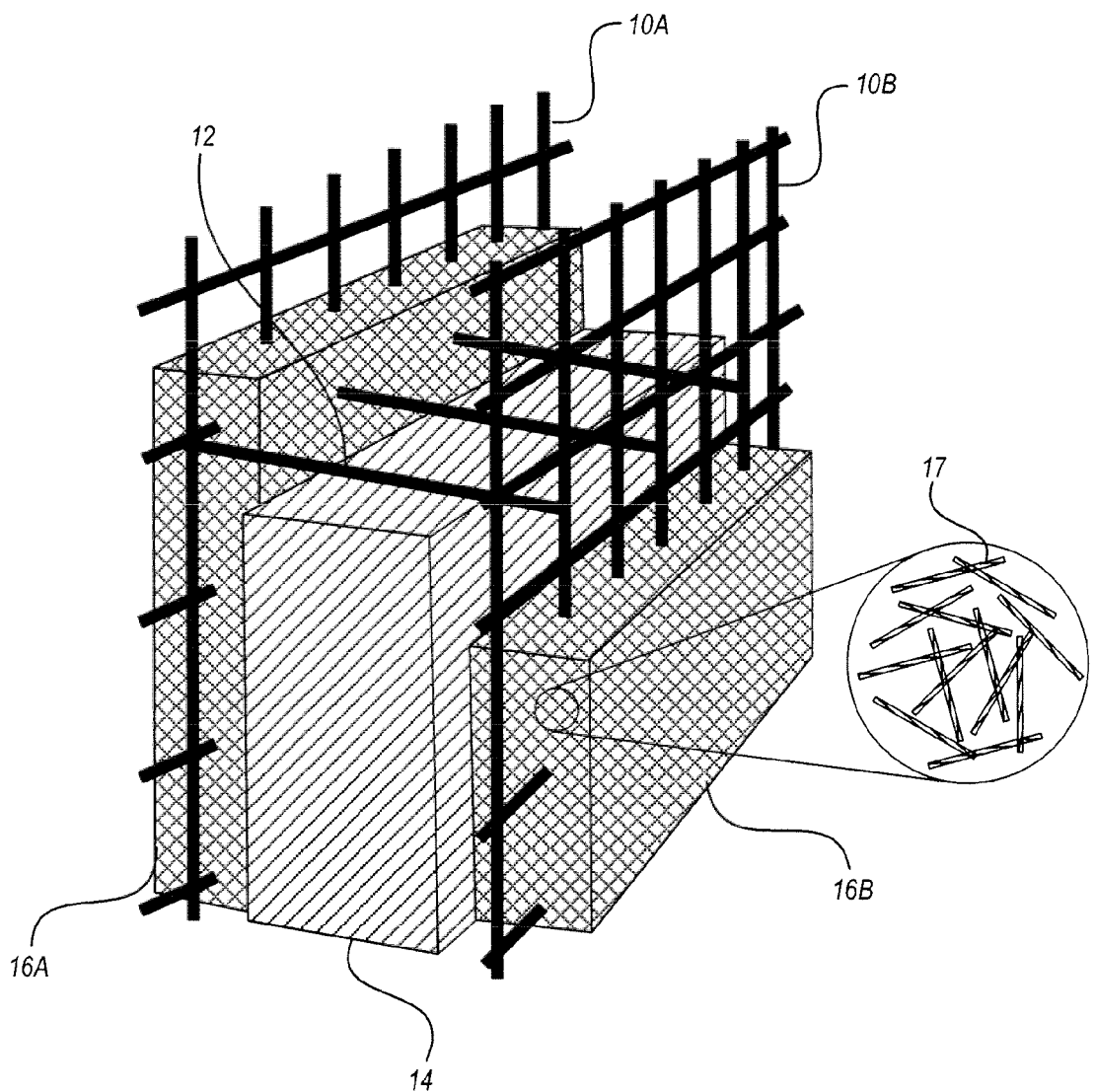
FIG. 1A is a cutaway view of a complete portion of a wall or ceiling showing two sets of wire mesh panels attached together through the insulating core, along with the inner and outer concrete portions according to an embodiment of the present invention.
Figure 1B:
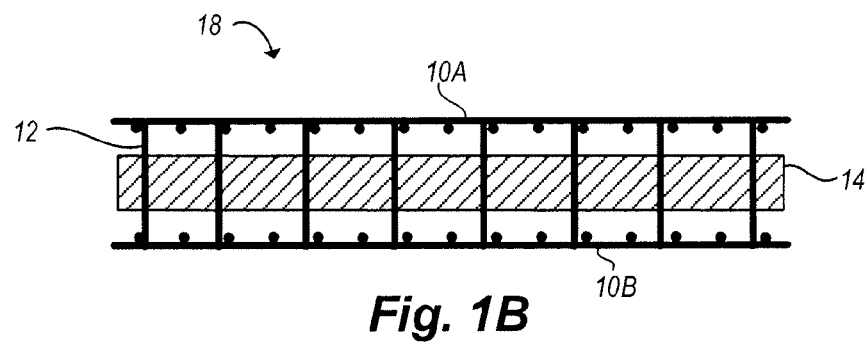
FIG. 1B is a cross-sectional view of a welded wire polystyrene panel according to an embodiment of the present invention.

Referring now to FIG. 1A a portion of a wall or ceiling is shown according to the present invention. The wall portion shown in FIG. 1A includes an outer 2" by 2" welded wire mesh panel 10A and an inner 2" by 2" welded wire mesh panel 10B. An insulating core 14, typically Type 1 modified expanding polystyrene, is placed between the two wire mesh panels 10A and 10B. The two wire mesh panels 10A and 10B are electro-welded together with wire members 12 through the polystyrene core 14. The wall portion shown in FIG. 1A also includes an outer concrete portion 16A formed of high strength, light-weight cellular concrete, reinforced with helical-shaped, steel micro-reinforcement fibers. FIG. 1A also includes an inner concrete portion 16B also formed of high strength, light-weight cellular concrete, reinforced with helical-shaped, steel micro-reinforcement fibers 17. FIG. 1B shows the wall portion, except for the concrete portions, in a cross-sectional view, which is also referred to as a welded wire mesh polystyrene panel 18. FIG. 1B shows the two welded wire mesh panels 10A and 10B coupled together with wire members 12. The polystyrene core 14 is shown located between the wire mesh panels 10A and 10B intersected by the wire members 12 coupling the wire mesh panels 10A and 10B.

Figure 1C:
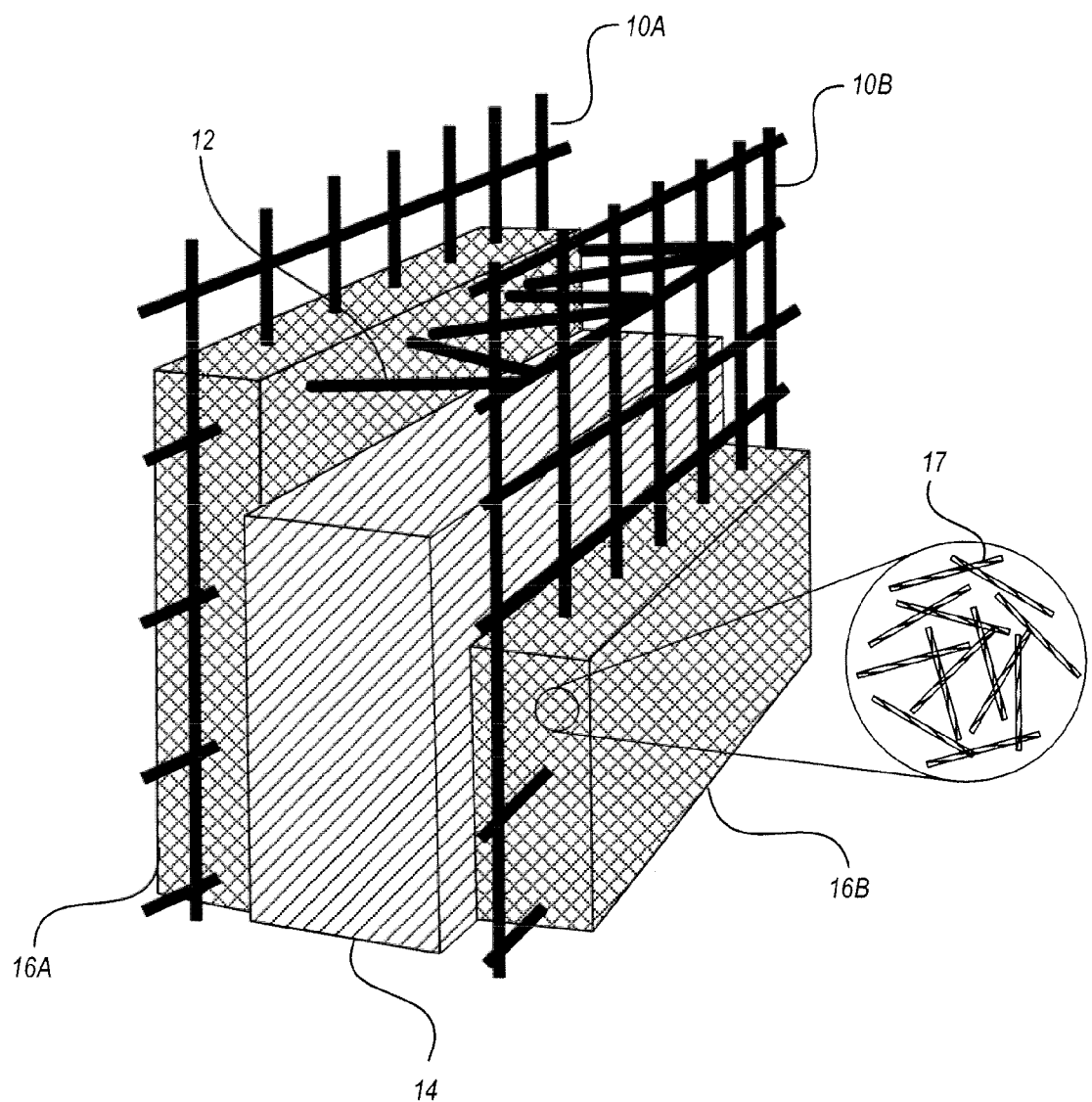
FIG. 1C is a cutaway view of a complete portion of a wall or ceiling showing two sets of wire mesh panels attached together through the insulating core, along with the inner and outer concrete portions according to an additional embodiment of the present invention.
Figure 1D:
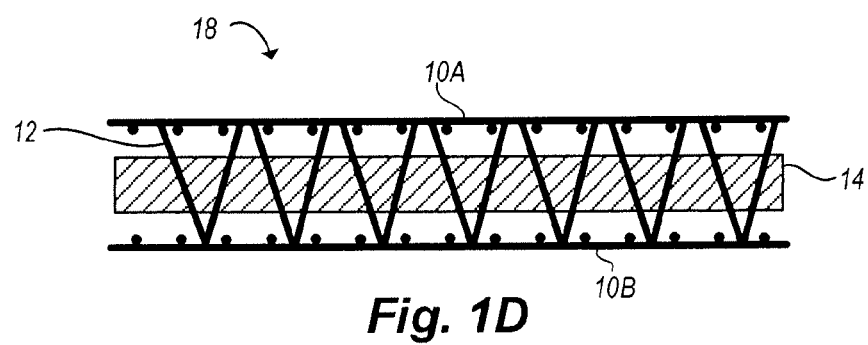
FIG. 1D is a cross-sectional view of a welded wire polystyrene panel according to an additional embodiment the present invention.

The embodiment of FIG. 1C is substantially the same as the embodiment of FIG. 1A, and the same reference numerals are used for the same elements. However, note that the wire members 12 are angled with respect to the wire mesh panels 10A and 10B. The wire members 12 still extend through the insulating core 14. Similarly, FIG. 1D substantially corresponds to FIG. 1B, previously described. Note again that the wire members 12 are angled with respect to wire mesh panels 10A and 10B, but still extend through the insulating core 14 as shown.

FIG. 2 through 10 illustrate the steps used to create a six-sided concrete module according to the present invention, in cross-sectional views.

Figure 2:
FIGS. 2-10 are cross-sectional views to the steps used to create a six-sided module according to the present invention.

Referring now to FIG. 2, concrete forms 20A and 20B are set to form the floor of the concrete module as shown.

Figure 3:
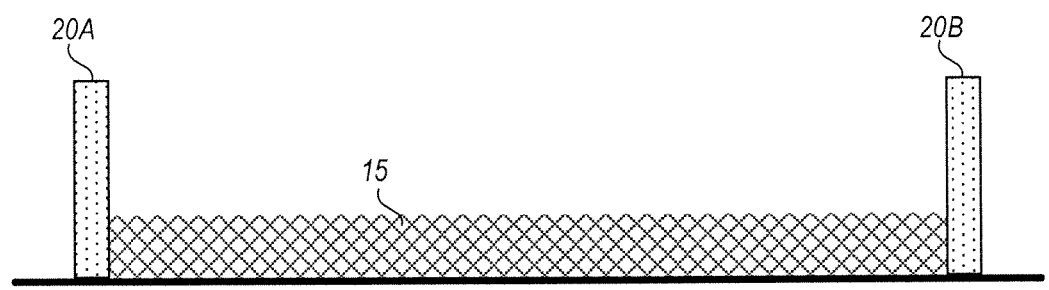

Referring now to FIG. 3, the floor 15 is partially formed. Concrete is poured to approximately one-third of the level of the concrete forms 20A and 20B. A high-strength, light-weight cellular concrete is used, reinforced with helical-shaped steel micro-reinforcement fibers as described above.

Figure 4:
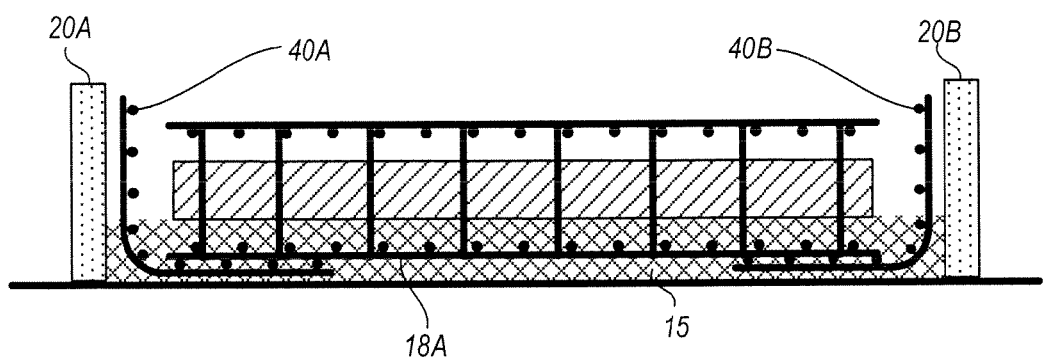

Referring now to FIG. 4, a welded-wire mesh polystyrene panel 18A and two connectors 40A and 40B are submerged into the wet concrete. Note that the connectors 40A and 40B are tied to the welded wire mesh polystyrene panel 18A to form a complete assembly as shown.

Figure 5:
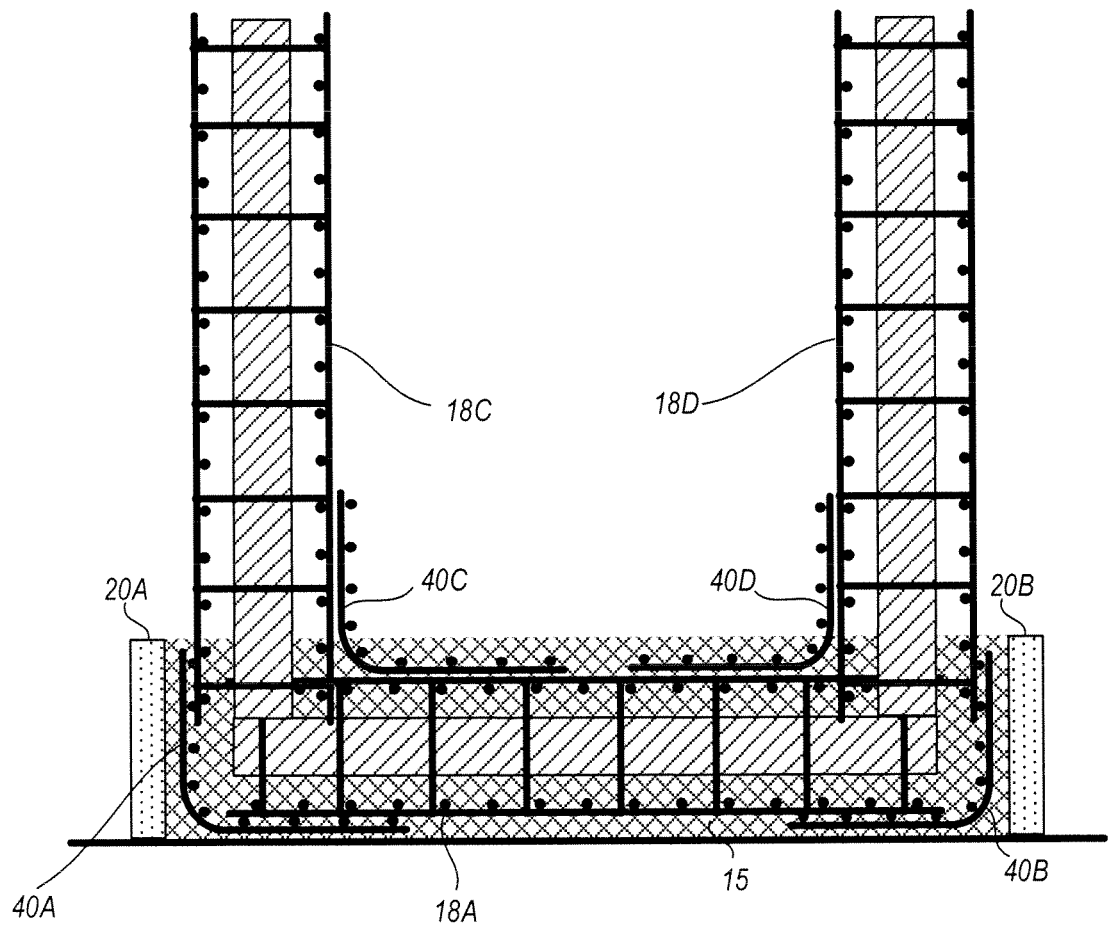

Referring now to FIG. 5, welded wire mesh polystyrene wall panels 18C and 18D are added to the assembly, using connectors 40C and 40D. Connectors 40C and 40D are tied to the existing assembly comprising panels 18A, 18C, and 18D. The remaining two-thirds of the concrete to the levels of the concrete forms 20A and 20B is poured, thus completing the floor 15 of the concrete module.

Figure 6:
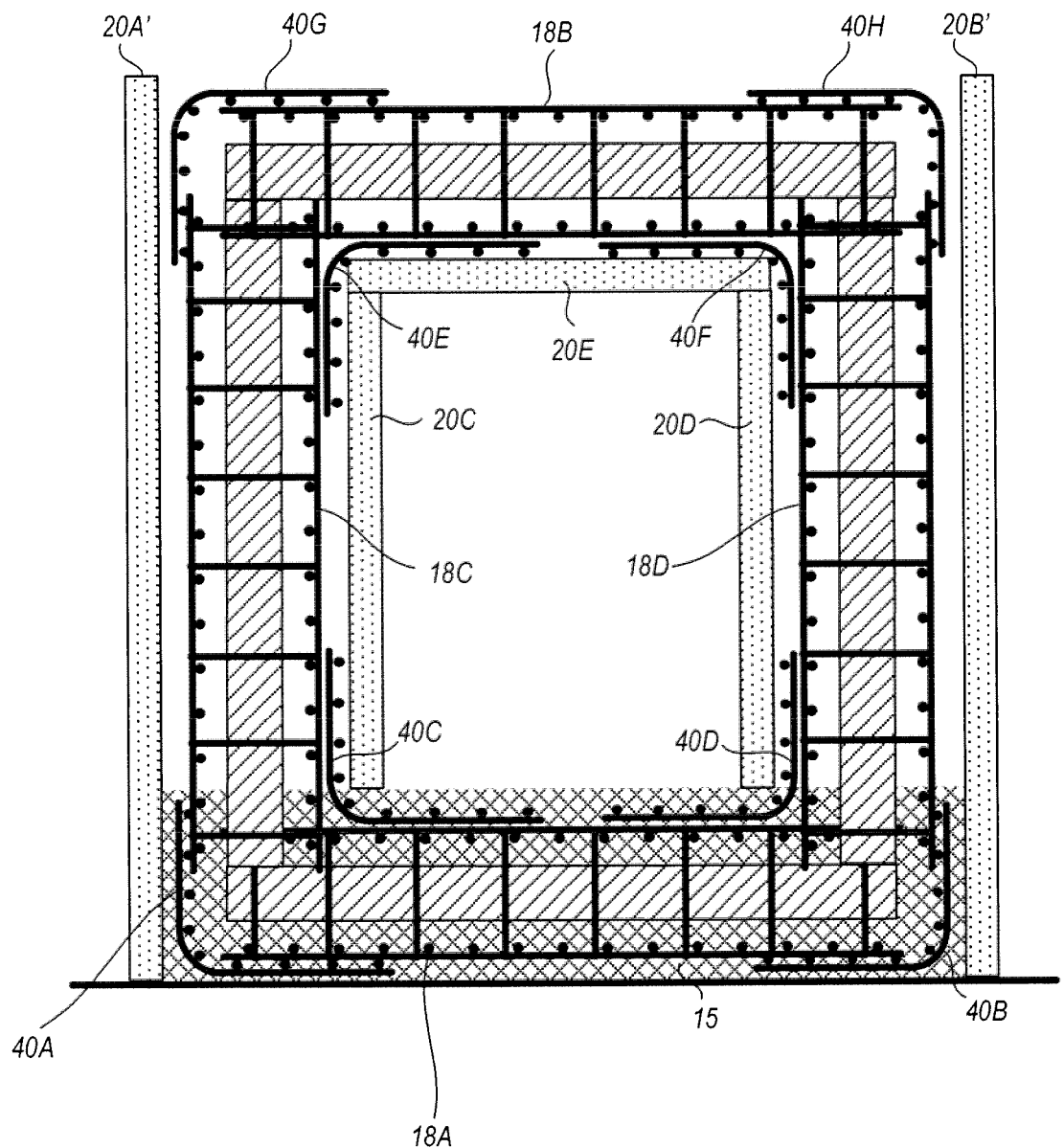

Referring now to FIG. 6, after the floor 15 hardens, the ceiling panel 18B is installed using additional connectors 40E, 40F, 40G, and 40H. All of these connectors are tied into the assembly as shown. New concrete forms 20A', 20B", 20C, 20D, and 20E are installed that will be used to create the completed walls and ceiling.

Figure 7:
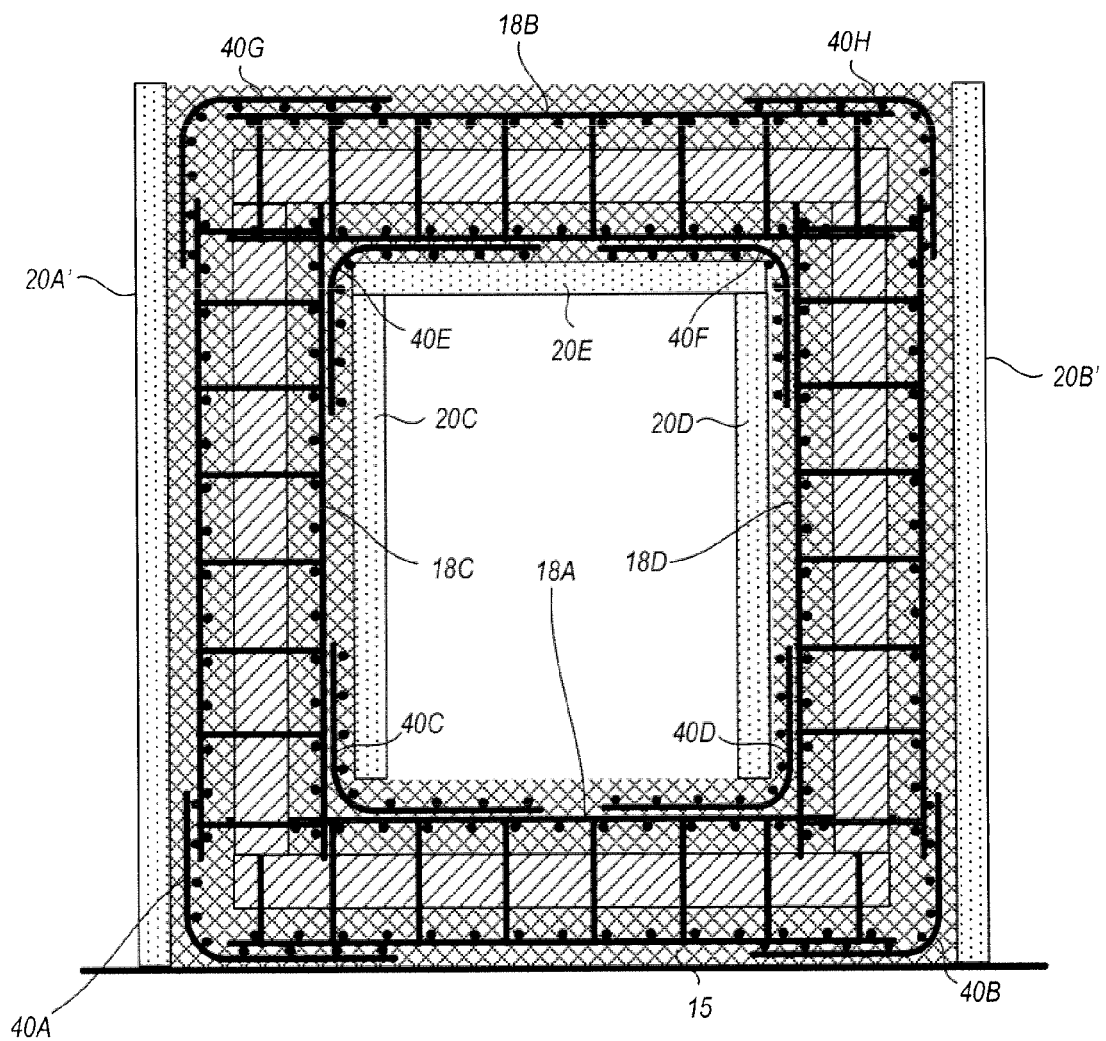

Referring now to FIG. 7, the remaining concrete is poured to complete the walls and the ceiling of the concrete module.

Figure 8:
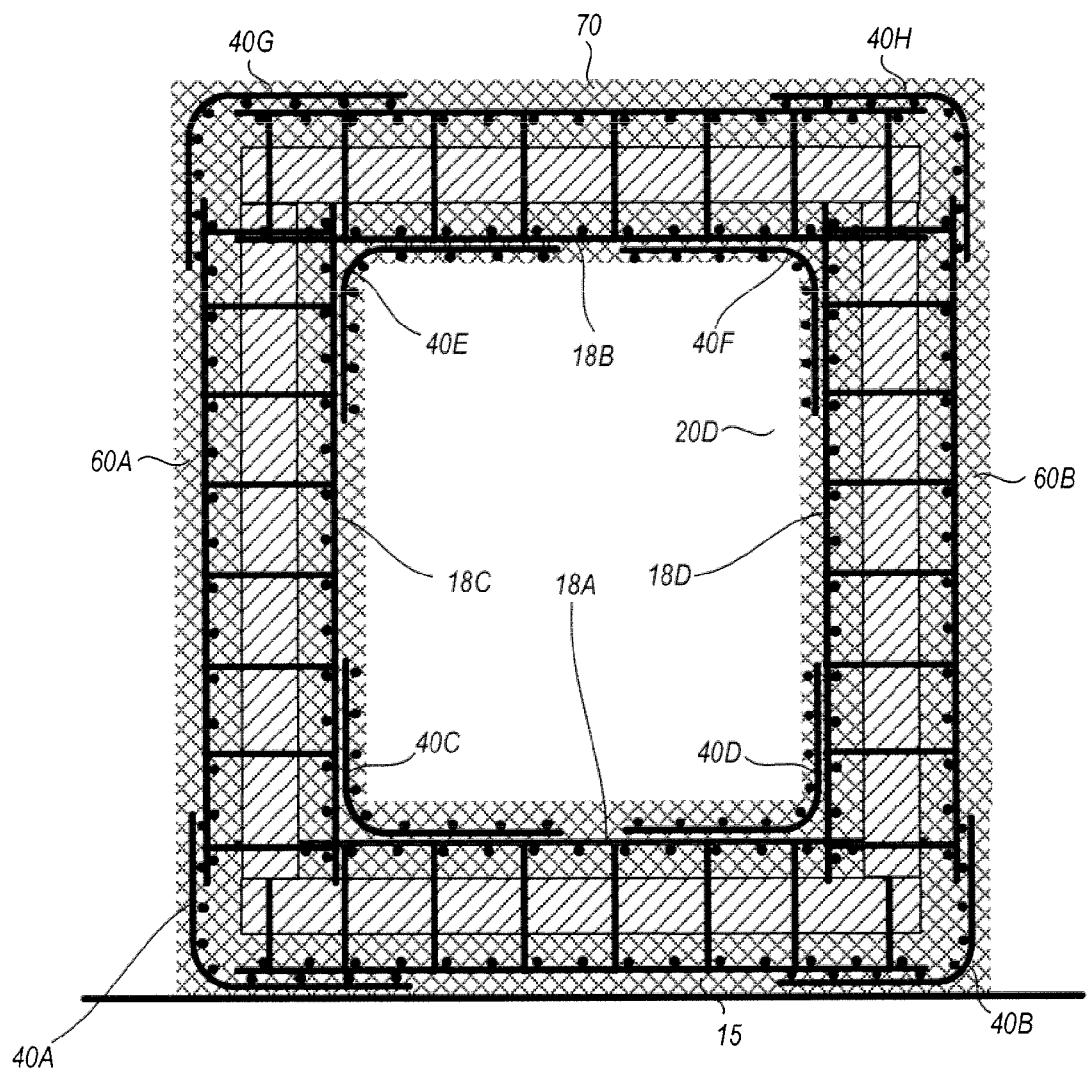

Referring now to FIG. 8, after the concrete hardens, the forms are removed to reveal the finished structure included the floor 15, walls 60A and 60B, and ceiling 70. All of the structural elements encapsulate the polystyrene panels 18A, 18B, 18C, and 18D, as well as the connectors 40A, 40B, 40C, 40D, 40E, 40F, 40G, and 40H as shown. While the six-sided concrete module is shown in cross-sectional form in FIG. 8, it will be appreciated by those skilled in the art that the entire structure can be translated into three dimensions to include two additional walls.

Figure 9:
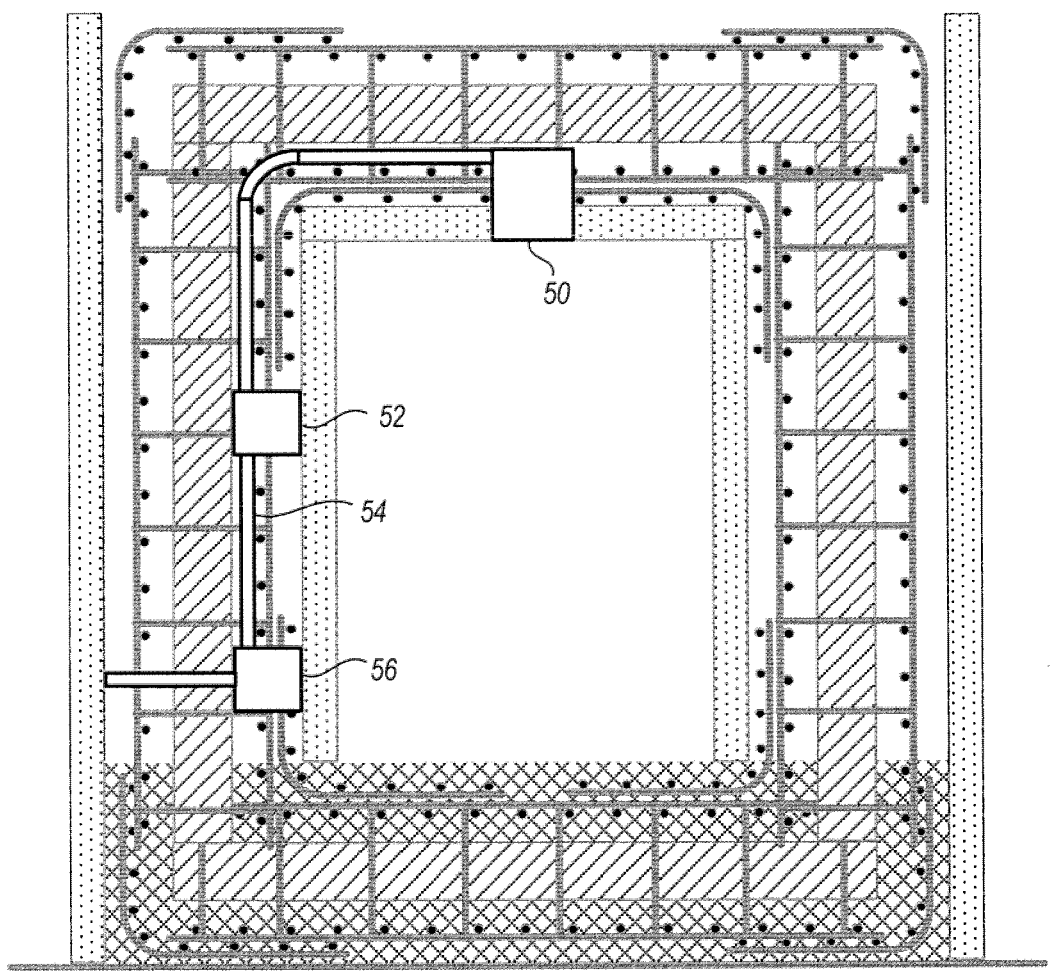
Figure 10:
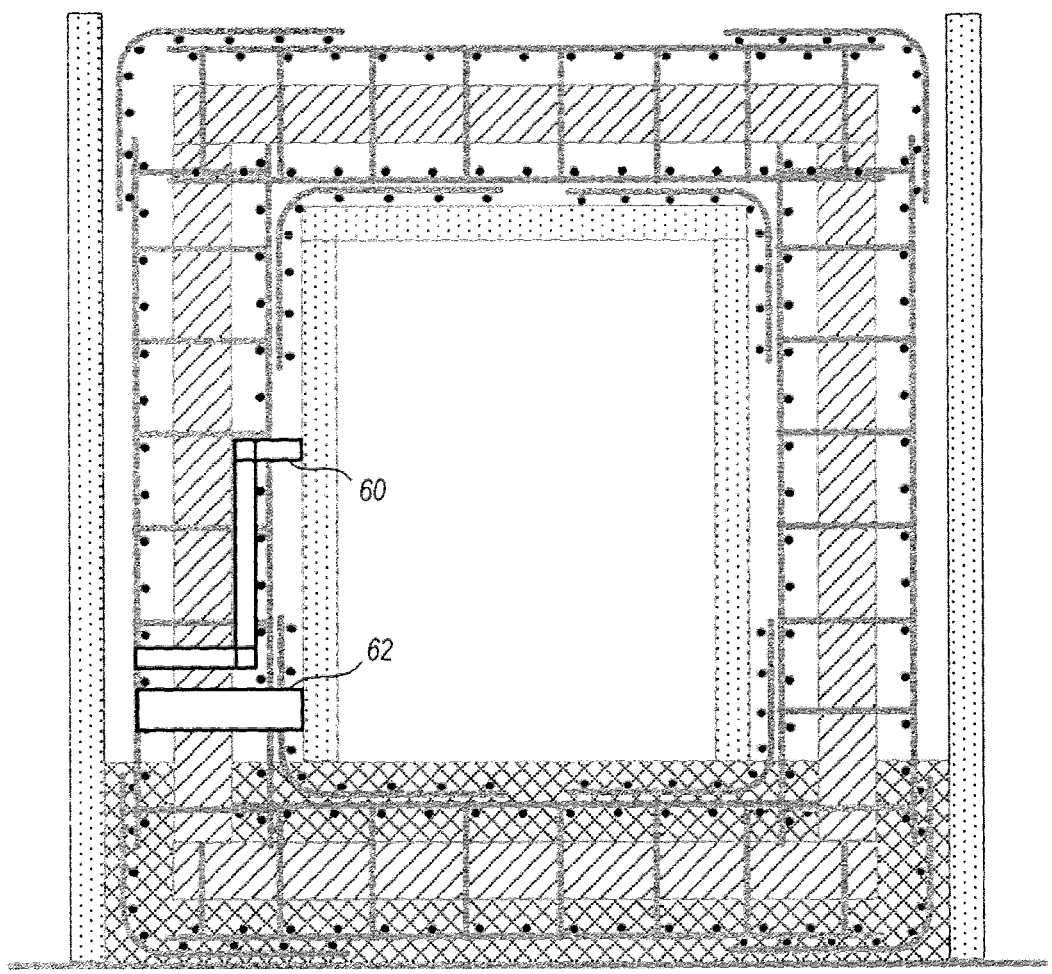

FIGS. 9 and 10 show optional electrical and plumbing fittings that can be installed before the concrete is poured.

Referring now to FIG. 9, after all of the welded wire mesh polystyrene panels and connectors have been installed and wired together, but before the concrete is poured, optional conduits and boxes for electrical, lighting, outlets, switches, and the like can be installed. FIG. 9 shows, for example, electrical box 50 that can be used for lighting, electrical box 52 for switching, conduit 54 for running wires, and electrical box 56 that can be used for an outlet. Other configurations can be used as known by those of skill in the art.

Referring now to FIG. 10, after all of the welded wire mesh polystyrene panels and connectors have been installed and wired together, but before the concrete is poured, optional plumbing for hot and cold water, toilets, sinks, drains, and the like can be installed. FIG. 10 shows, for example, a water feed pipe 60 that can be used for an appliance such as a sink, and a water drain pipe 62 that can also be used for an appliance such as a sink. Other configurations can be used as known by those of skill in the art.

Figure 11:
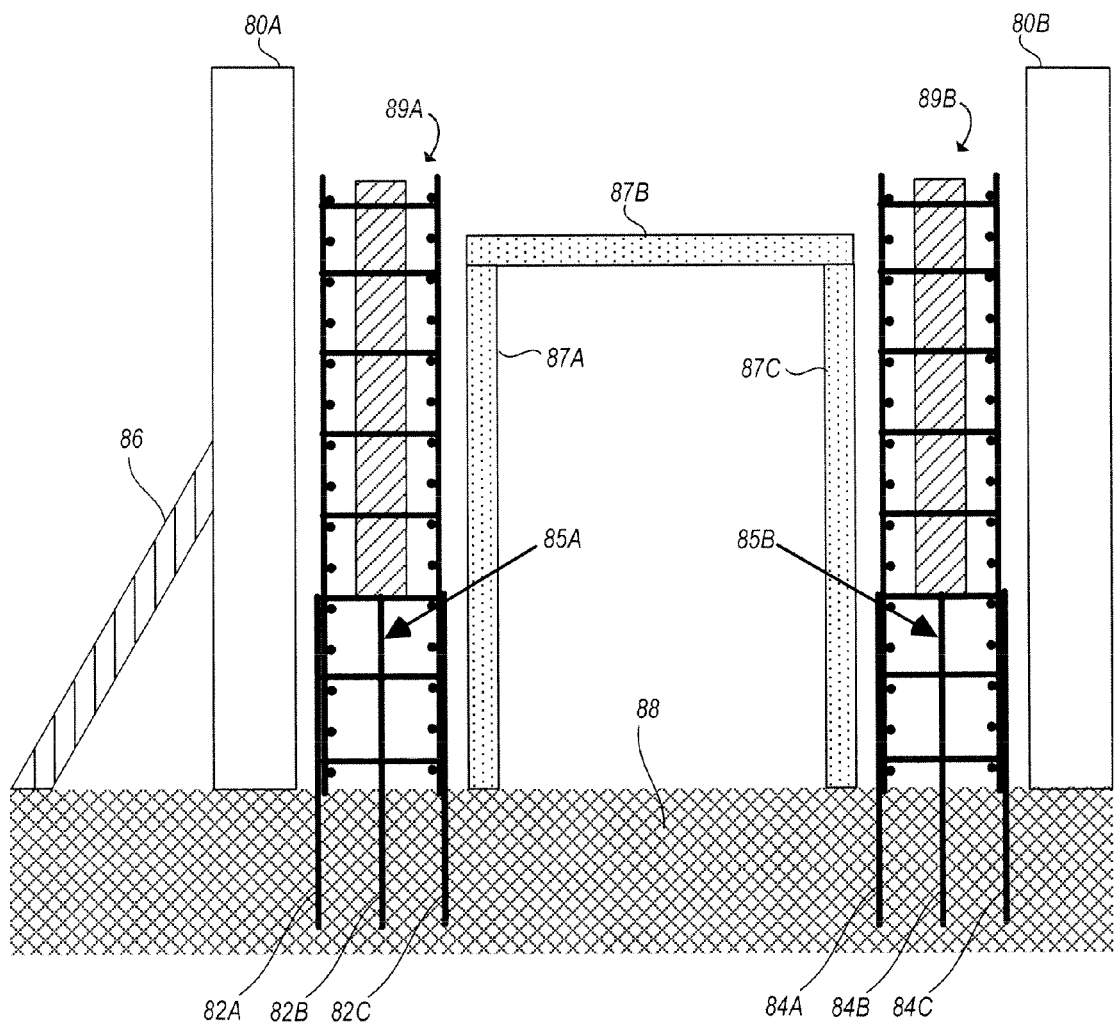
FIG. 11 is a cross-sectional view of retro-fit embodiment of the present invention.

Referring now to FIG. 11, a retro-fit embodiment of the present invention is shown. In the retro-fit embodiment, the method of the present invention proceeds substantially as previously described with minor adjustments as described below. Concrete forms 87A, 87B, and 87C are installed inside of an existing room to form walls and a ceiling using the existing walls 80A and 80B as shown. An exterior brace 86 or braces may be required to strengthen the existing walls during concrete pouring. Rebar dowels 82A, 82B, 82C, 84A, 84B, and 84C are epoxied into the existing floor slab 88. Welded-wire mesh polystyrene panel 89A is wired or otherwise coupled to rebar dowels 82A, 82B, and 82C as shown. Welded-wire mesh polystyrene panel 89B is wired or otherwise coupled to rebar dowels 84A, 84B, and 84C as shown. Once the structure shown in FIG. 11 has been completed, concrete can be poured as before. Holes may have to be drilled into the existing ceiling to provide access for the poured concrete. Note in FIG. 11 that part of the polystyrene core of panels 89A and 89B may have to be removed at location 85A and 85B as required for attachment to the rebar dowels as shown. Electrical and plumbing provisions can be made as previously described.

Figure 12:
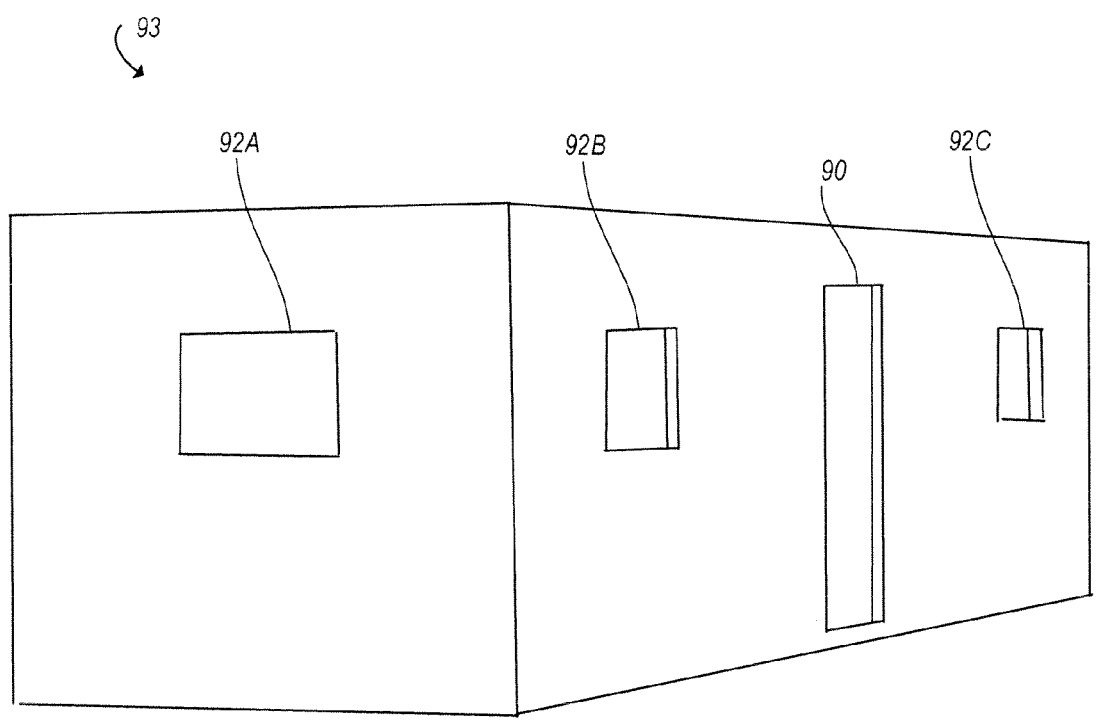
FIG. 12 is shows the completed concrete structure with openings for a door and windows according to the present invention.

Referring now to FIG. 12, the completed concrete structure 93 is shown with window and door openings. Window openings 92A, 92B, and 92C are shown. Door opening 90 is also shown. Window and door openings can be obtained using additional forms or frames as is known in the art.

While the invention has been particularly shown and described with reference to preferred embodiments thereof, it will be understood by those skilled in the art that various other changes in the form and details may be made without departing from the spirit and scope of the invention. It should be understood that this description has been made by way of example, and that the invention is defined by the scope of the following claims.

I claim:

1. A method of constructing an integrated six-sided concrete module comprising a floor, four walls, and a ceiling, the method comprising:
   setting a first set of concrete forms for forming the floor of the concrete module;
   partially forming the floor by pouring concrete to partially fill the concrete forms;
   submerging a floor panel and a first set of connectors into the partially formed floor;
   coupling wall panels and a second set of connectors to the floor panel;
   pouring concrete to completely fill the first set of concrete forms to form the floor of the concrete module;
   coupling a ceiling panel and a third set of connectors to the wall panels;
   removing the first set of concrete forms;
   setting a second set of concrete forms for forming the walls and the ceiling of the concrete module;
   pouring concrete to complete the walls and the ceiling of the concrete module; and
   after the poured concrete hardens, removing the second set of concrete forms to reveal the finished six-sided concrete module,
   wherein the floor panel, the wall panels, and the ceiling panel each comprise a welded wire mesh foam panel, and wherein pouring concrete comprises pouring concrete directly over at least one of said welded wire mesh panels.

2. The method of claim 1, wherein partially forming the floor comprising forming concrete to approximately one-third of the level of the first set of concrete forms.

3. The method of claim 1, wherein the concrete used comprises a high-strength concrete having a strength of about 4,000 psi to 20,000 psi.

4. The method of claim 1, wherein the concrete used comprises a light-weight concrete having a density of about 90 lbs to 120 lbs per cubic foot.

5. The method of claim 1, wherein the concrete used comprises cellular concrete reinforced with helical-shaped steel micro-reinforcement fibers.

6. The method of claim 1 wherein the floor panel, the wall panels, and the ceiling panel each comprise a welded wire mesh polystyrene panel.

7. The method of claim 6 wherein the welded wire mesh polystyrene panel comprises a first welded wire mesh, a second wire mesh, and a polystyrene core.

8. The method of claim 7 wherein the first welded wire mesh and the second wire mesh are coupled together using wires extending through the polystyrene core.

9. The method of claim 1 wherein the first, second, and third sets of connectors each comprise L-shaped connectors.

10. The method of claim 1 further comprising installing electrical, plumbing, or other design-required provisions prior to pouring concrete to complete the walls and the ceiling of the concrete module.

11. A method of constructing an integrated six-sided concrete module comprising a floor, four walls, and a ceiling inside an existing structure, the method comprising:
    coupling rebar dowels into an existing floor slab;
    attaching wall panels to the rebar dowels;
    attaching a ceiling panel to the wall panels;
    setting interior concrete forms for forming the walls and the ceiling;
    pouring concrete to complete the walls and the ceiling of the concrete module; and
    after the poured concrete hardens, removing the set of interior concrete forms to reveal the finished six-sided concrete module inside the existing structure,
    wherein the wall panels, and the ceiling panel each comprise a welded wire mesh foam panel, and wherein pouring concrete comprises pouring concrete directly over at least one of said welded wire mesh panels.

12. The method of claim 11, further comprising externally bracing walls of the existing structure.

13. The method of claim 11, wherein the concrete used comprises a high-strength concrete having a strength of about 4,000 psi to 20,000 psi.

14. The method of claim 11, wherein the concrete used comprises a light-weight concrete having a density of about 90 lbs to 120 lbs per cubic foot.

15. The method of claim 11, wherein the concrete used comprises cellular concrete reinforced with helical-shaped steel micro-reinforcement fibers.

16. The method of claim 11 wherein the wall panels, and the ceiling panel each comprise a welded wire mesh polystyrene panel.

17. The method of claim 16 wherein the welded wire mesh polystyrene panel comprises a first welded wire mesh, a second wire mesh, and a polystyrene core.

18. The method of claim 17 wherein the first welded wire mesh and the second wire mesh are coupled together using wires extending through the polystyrene core.

19. The method of claim 11 wherein the rebar dowels are epoxied into the existing floor slab.

20. The method of claim 11 further comprising installing electrical, plumbing, or other design-required provisions prior to pouring the concrete.

* * * * *